(12) United States Patent
Parker et al.

(10) Patent No.: US 7,059,537 B2
(45) Date of Patent: Jun. 13, 2006

(54) ENGINE PRE-HEATER SYSTEM

(76) Inventors: Randall D. Parker, Box 285, Alameda, Saskatchewan (CA) S0C 0A0; Vincent D. Parker, Box 171, Alameda, Saskatchewan (CA) S0C 0A0

( * ) Notice: Subject to any disclaimer, the term of this patent is extended or adjusted under 35 U.S.C. 154(b) by 123 days.

(21) Appl. No.: 10/871,397

(22) Filed: Jun. 21, 2004

(65) Prior Publication Data

US 2005/0279848 A1 Dec. 22, 2005

(51) Int. Cl.
*B60H 1/02* (2006.01)

(52) U.S. Cl. .......................... 237/12.3 C; 237/12.3 R; 165/41; 165/42

(58) Field of Classification Search ........... 237/12.3 R, 237/12.3 B, 12.3 C; 165/41, 42
See application file for complete search history.

(56) References Cited

U.S. PATENT DOCUMENTS

| | | | |
|---|---|---|---|
| 1,237,862 A | 8/1917 | Bintliff | |
| 3,059,692 A | 10/1962 | Smitley | |
| 3,235,084 A | 2/1966 | King et al. | |
| 4,208,570 A * | 6/1980 | Rynard | 219/208 |
| 4,258,676 A | 3/1981 | Lamm | |
| 4,585,924 A | 4/1986 | Pakula | |
| 4,770,134 A * | 9/1988 | Foreman et al. | 123/142.5 R |
| 4,940,041 A * | 7/1990 | Riedmaier et al. | 126/110 R |
| 5,147,014 A | 9/1992 | Pederson | |
| 5,178,323 A * | 1/1993 | Hanson | 237/2 A |
| 5,215,834 A | 6/1993 | Reher et al. | |
| 5,398,747 A * | 3/1995 | Miaoulis | 165/41 |
| 5,791,407 A * | 8/1998 | Hammons | 165/202 |
| 6,010,076 A * | 1/2000 | Winik | 237/12.3 B |
| 6,082,625 A * | 7/2000 | Faccone et al. | 237/12.3 C |
| 6,152,128 A * | 11/2000 | Willey et al. | 126/110 B |
| 6,772,722 B1 * | 8/2004 | Young et al. | 123/142.5 R |

\* cited by examiner

*Primary Examiner*—Derek S. Boles
(74) *Attorney, Agent, or Firm*—Donald R. Schoonover

(57) ABSTRACT

A system for pre-heating an internal combustion engine includes a heated gas generator unit that is connected to water flowing through the engine in a manner to transfer heat from the heated gases to the water. Once the engine is pre-heated, the system embodying the present invention is disconnected from the internal combustion engine.

2 Claims, 4 Drawing Sheets

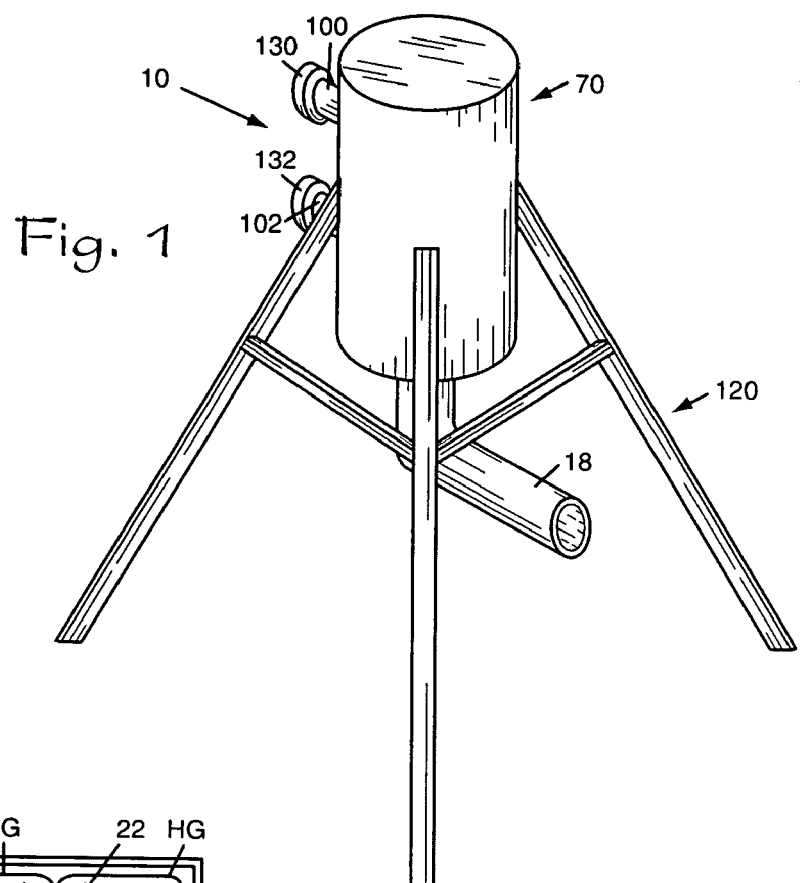
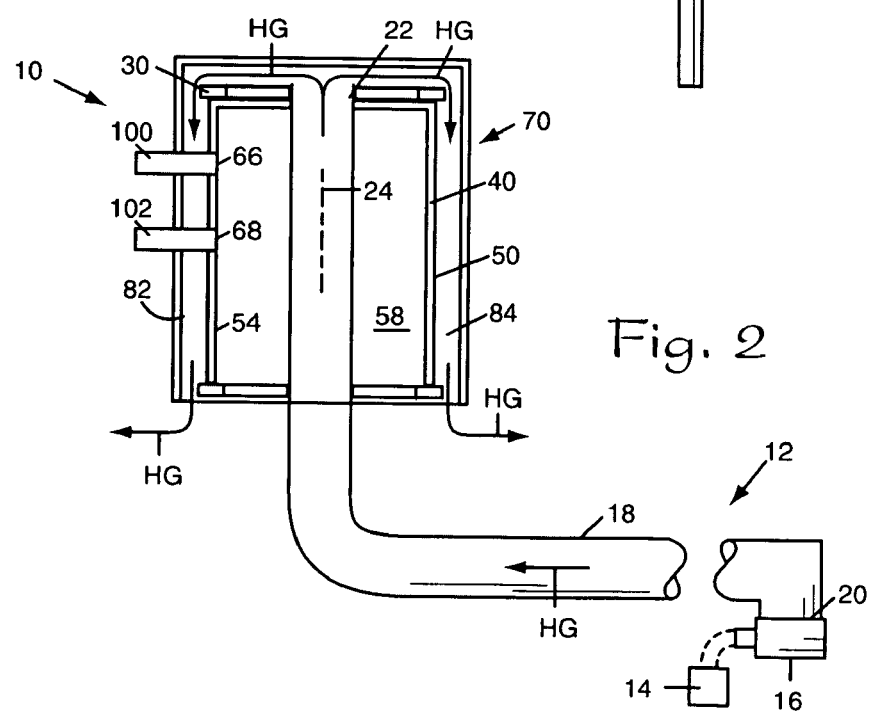

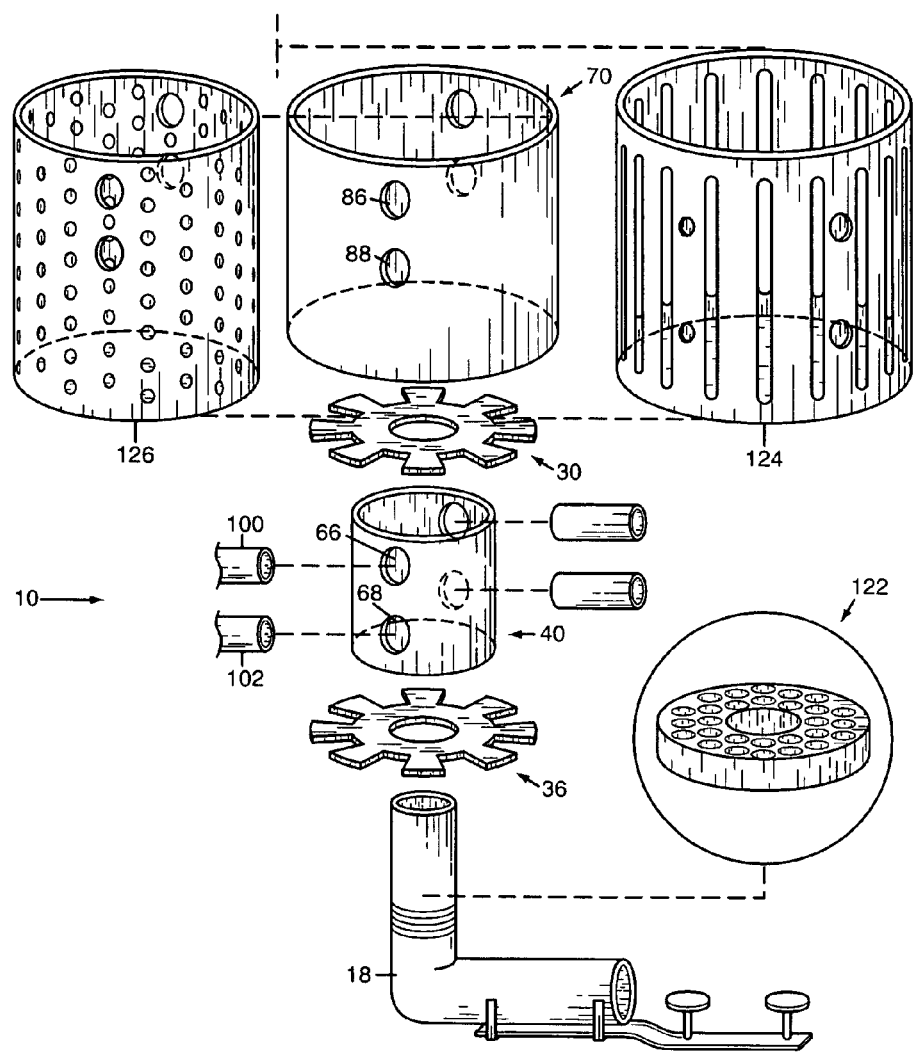

ENGINE PRE-HEATER SYSTEM

BACKGROUND OF THE INVENTION

1. Field of the Invention

The present invention relates to the general art of heaters, and to the particular field of heating equipment.

2. Discussion of the Related Art

Many vehicles must remain outside nearly all the time. During winter, these vehicles are often difficult to start, and once started, take a long time to warm up. During start-up and warm-up, many of these vehicles are quite inefficient and wasteful of fuel. During warm-up periods, some engine parts may be subject to increased wear. The foregoing is true for nearly all internal combustion engines.

Therefore, there is a need for a system for pre-heating an internal combustion engine.

While the art contains several examples of engine pre-heating systems, the inventor is not aware of any engine pre-heating system that is easily connected to the engine and will safely, efficiently and effectively pre-heat an internal combustion engine.

Therefore, there is a need for an engine pre-heating system that is easily connected to the engine and will safely, efficiently and effectively pre-heat an internal combustion engine.

While some known engine pre-heaters are somewhat efficient, the inventor is not aware of any such system that is amenable to use with a wide variety of engines, or which is amenable for use in a variety of applications.

Therefore, there is a need for a system for pre-heating an internal combustion engine that is versatile and is amenable for use with a wide variety of applications.

In order to be most versatile, such a system should be amenable to use with a wide variety of accessories, such as pumps, additional heater elements, special valves, fans, various heating sources, control systems, insulating systems, fluid flow control elements, shielding, and the like.

Therefore, there is a need for a system for pre-heating an internal combustion engine that is versatile and is amenable for use with a wide variety of accessories.

PRINCIPAL OBJECTS OF THE INVENTION

It is a main object of the present invention to provide a system for pre-heating an internal combustion engine.

It is another object of the present invention to provide an engine pre-heating system that is easily connected to the engine and will safely, efficiently and effectively pre-heat an internal combustion engine.

It is another object of the present invention to provide a system for pre-heating an internal combustion engine that is versatile and is amenable to use with a wide variety of accessories.

SUMMARY OF THE INVENTION

These, and other, objects are achieved by an engine pre-heater system that includes a gas burner which generates heated gas and a flow system that circulates water from an internal combustion engine past the heated gases to have heat from the heated gases transferred to the water. The heated water is then circulated back to an engine to warm that engine.

Using the engine pre-heater system embodying the present invention will permit the efficient and effective pre-heating of an internal combustion engine. The system embodying the present invention is easily connected to and disconnected from an engine and thus is very versatile. The system is amenable for use with a wide variety of engines in both commercial and military areas. The system is also amenable to use with a wide variety of accessories whereby the system is made even more versatile.

BRIEF DESCRIPTION OF THE DRAWING FIGURES

FIG. 1 is a perspective view of an engine pre-heater embodying the present invention.

FIG. 2 is a schematic representation of the engine pre-heater flow circuit.

FIG. 5 is an exploded perspective of alternative forms of the engine pre-heater embodying the present invention.

DETAILED DESCRIPTION OF THE PREFERRED EMBODIMENT

Figure 3:
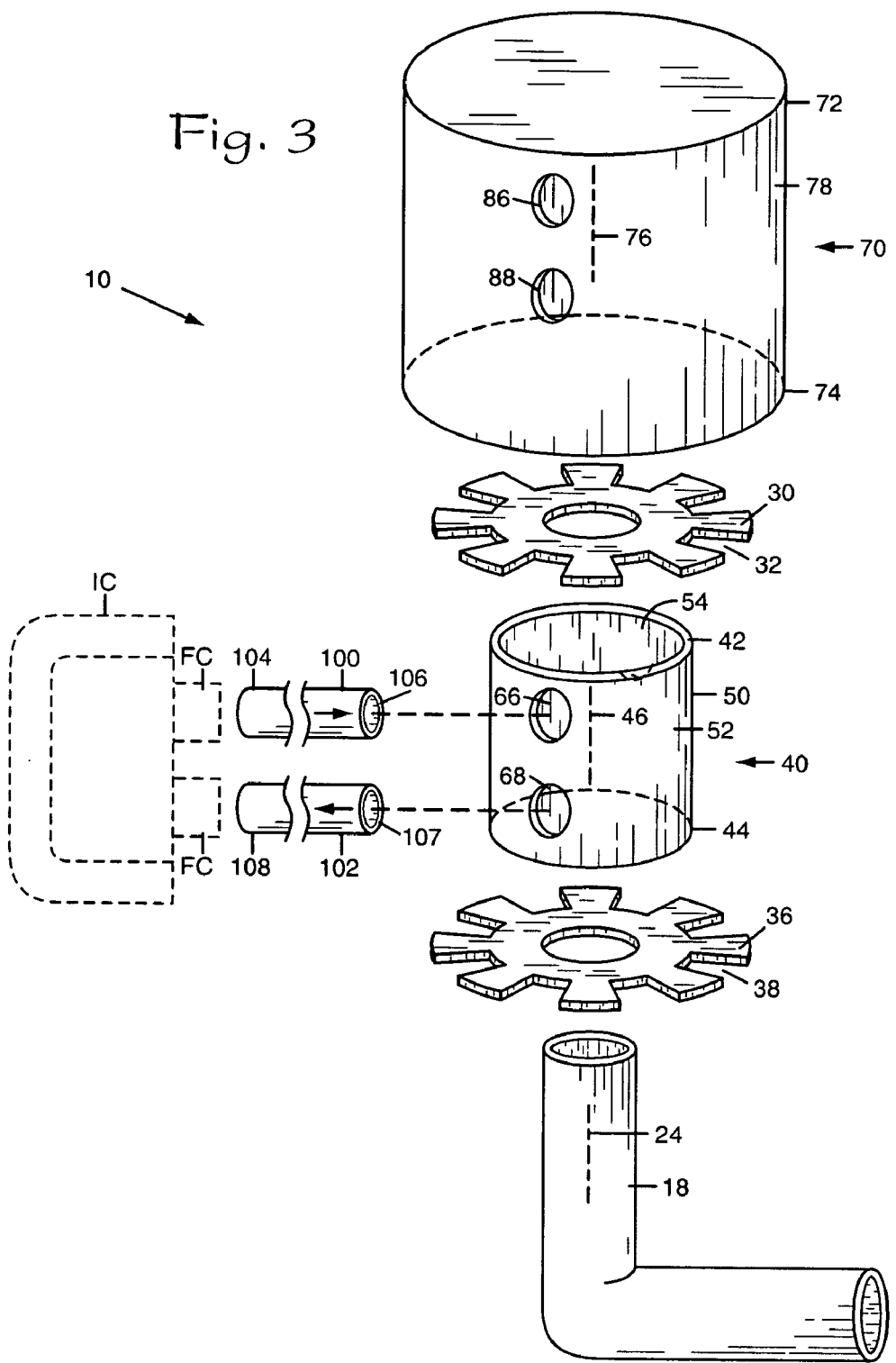
FIG. 3 is an exploded perspective of the engine pre-heater embodying the present invention.
Figure 4:
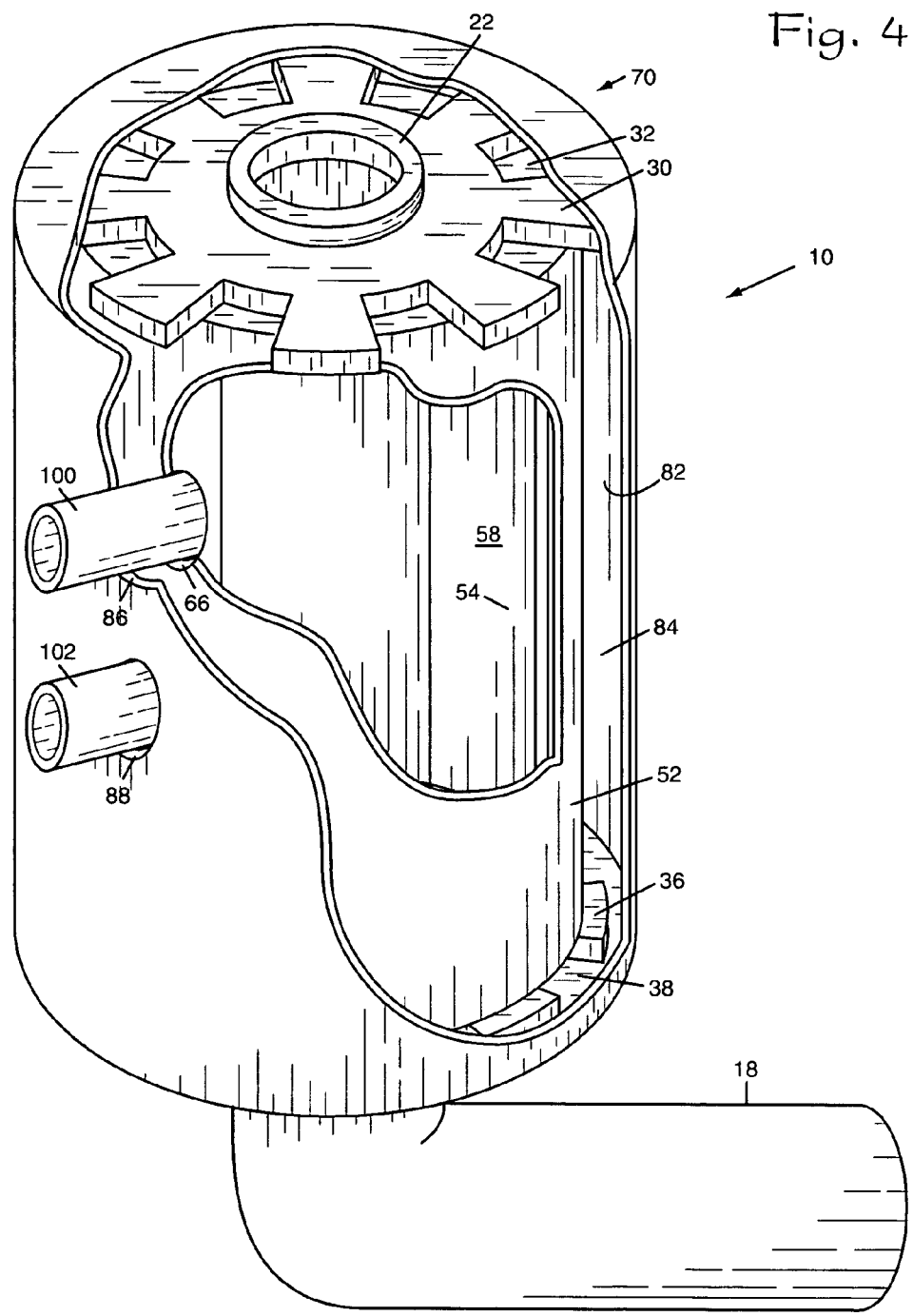
FIG. 4 is a cut-away view of an assembled engine pre-heater embodying the present invention.

Other objects, features and advantages of the invention will become apparent from a consideration of the following detailed description and the accompanying drawings.

Referring to the Figures, it can be understood that the present invention is embodied in an engine pre-heater system 10. System 10 comprises a gas burner unit 12 which includes a source of gas 14, a burner 16 fluidically connected to the source of gas 14, and a fluid conduit 18 having an inlet end 20 that is fluidically connected to the burner 16 to receive heated gas HG from the burner 16. Fluid conduit 18 has an outlet end 22 and an outlet end axis 24.

A first support element 30 is fixed to the fluid conduit 18. First support element 30 includes a plurality of fluid passages 32 defined therethrough to be in fluid communication with outlet end 22 of fluid conduit 18.

A second support element 36 is fixed to the fluid conduit 18 and includes a plurality of fluid passages 38 defined therethrough. Fluid passages 38 are in fluid communication with outlet end 22 of fluid conduit 18 via fluid passages 32 defined in first support element 30 whereby heated gas HG exiting the outlet end 22 of the fluid conduit 18 flows through fluid passages 32 defined in first support element 30 to and through fluid passages 38 defined in second support element 36.

A first hollow cylindrical housing 40 is fixed to the first and second support elements 30, 36 to be supported on fluid conduit 18. First hollow cylindrical housing 40 surrounds the fluid conduit 18 near outlet end 22 of the fluid conduit 18. First hollow cylindrical housing 40 includes a first end 42 supported on first support element 30. First end 42 of the first cylindrical housing 40 is impervious to fluid.

A second end 44 of housing 40 is supported on second support element 36. Second end 44 of first cylindrical housing 40 is impervious to fluid.

A longitudinal axis 46 extends between first end 42 of the first cylindrical housing 40 and second end 44 of the first cylindrical housing 40. Longitudinal axis 46 is co-linear with longitudinal axis 24 of outlet end 22 of fluid conduit 18.

A cylindrical wall 50 connects first end 42 of the first cylindrical housing 40 to second end 44 of the first cylindrical housing 40. Cylindrical wall 50 has an outside surface 52 and an inside surface 54 that is located adjacent to fluid conduit 18 and which is in heat-transferring communication with fluid conduit 18.

An inside volume 58 is defined by inside surface 54 of cylindrical wall 50 of first cylindrical housing 40 and fluid conduit 18.

Outside surface 52 of cylindrical wall 50 of the first hollow cylindrical housing 40 is in fluid communication with heated gas exiting fluid conduit 18.

Two ports 66 and 68 are defined through cylindrical wall 50. The ports 66, 68 are spaced apart from each other in the direction of longitudinal axis 46 of the first hollow cylindrical housing 40.

A second hollow cylindrical housing 70 is fixed to the first and second support elements 30, 36 and surrounds first hollow cylindrical housing 40. Second hollow cylindrical housing 70 includes a first end 72 supported on first support element 30. First end 72 of second cylindrical housing 70 is impervious to fluid. Housing 70 further includes a second end 74 which is supported on second support element 36, and a longitudinal axis 76 extends between first end 72 of the second cylindrical housing 70 and second end 74 of the second cylindrical housing 70. Longitudinal axis 76 of the second cylindrical housing 70 is co-linear with outlet end axis 24 of fluid conduit 18.

Second cylindrical housing 70 further includes a cylindrical wall 78 connecting first end 72 of the second cylindrical housing 70 to second end 74 of the second cylindrical housing 70. Cylindrical wall 78 of the second cylindrical housing 70 has an inside surface 82 that is located adjacent to outside surface 52 of cylindrical wall 50 of first cylindrical housing 40.

A gas flow volume 84 is defined by inside surface 82 of the cylindrical wall 78 of second cylindrical housing 70 and outside surface 52 of cylindrical wall 50 of first cylindrical housing 40.

Outside surface 52 of cylindrical wall 50 of first hollow cylindrical housing 40 is in heat-transferring communication with gas flow volume 84.

Two ports 86 and 88 are defined through cylindrical wall 78, and are spaced apart from each other in the direction of longitudinal axis 76 of the second hollow cylindrical housing 70 and is aligned with ports 66 and 68 respectively of first cylindrical housing 40.

System 10 further includes first and second flexible fluid conduits 100 and 102 extending through the ports 66, 68, 86, 88 defined through the cylindrical walls 50, 78 of the first and second cylindrical housings 40, 70. First flexible fluid conduit 100 has an inlet end 104 fluidically connected to a fluid circuit FC of an internal combustion engine IC and an outlet 106 fluidically connected to inside volume 58 of first hollow cylindrical housing 40. The fluid circuit and the internal combustion engine are not shown as those skilled in the art will understand the nature and makeup of such elements. Second flexible fluid conduit 102 has an inlet end 107 fluidically connected to inside volume 58 of the first hollow cylindrical housing 40 and an outlet end 108 fluidically connected to the fluid circuit of the internal combustion engine.

Quick-connect and disconnect hardware 130 and 132 can be located on flexible conduits 100 and 102 so connection and disconnection of the system 10 to the engine is facilitated.

Operation of system 10 can be understood by those skilled in the art based on the teaching of this disclosure. System 10 is connected to the engine to be heated and burner 16 is activated. Heated gas flows from burner 16 through conduit 18 and then through volume 84 and transfers heat to fluid flowing in volume 58. The heated fluid flows to and through an engine block of an internal combustion engine and heats that engine block. The fluid flows due to thermal factors. Once the engine is sufficiently heated, system 10 is disconnected from the engine.

System 10 can include several accessories, such as a support stand 120 shown in FIG. 1, a flame arrester 122 shown in FIG. 5, a casing 124 or a half casing 126 also shown in FIG. 5, flow control valves, pressure relief valves, pressure and temperature gauges, pumps, nozzles, control systems, various nipples and fluid connectors, fans, conduits, insulating blankets, drains, plugs and the like.

It is to be understood that while certain forms of the present invention have been illustrated and described herein, it is not to be limited to the specific forms or arrangements of parts described and shown.

The invention claimed is:

1. An engine pre-heater system comprising:
    (a) a gas burner unit which includes
        (1) a source of gas,
        (2) a burner fluidically connected to the source of gas, and
        (3) a fluid conduit having an inlet end that is fluidically connected to the burner to receive heated gas from the burner, the fluid conduit having an outlet end and an outlet end axis;
    (b) a first support element fixed to the fluid conduit, the first support element including a plurality of fluid passages defined therethrough, the fluid passages defined in said first element being in fluid communication with the outlet end of the fluid conduit;
    (c) a second support element fixed to the fluid conduit, the first support element including a plurality of fluid passages defined therethrough, the fluid passages defined in said second support element being in fluid communication with the outlet end of the fluid conduit via the fluid passages defined in said first support element whereby heated gas exiting the outlet end of the fluid conduit flows through the fluid passages defined in said first support element to and through the fluid passages defined in said second support element;
    (d) a first hollow cylindrical housing fixed to the first and second support elements, the first hollow cylindrical housing surrounding the fluid conduit near the outlet end of the fluid conduit, the first hollow cylindrical housing including
        (1) a first end supported on said first support element, the first end of said first cylindrical housing being impervious to fluid,
        (2) a second end supported on said second support element, the second end of said first cylindrical housing being impervious to fluid,
        (3) a longitudinal axis extending between the first end of the first cylindrical housing and the second end of the first cylindrical housing, the longitudinal axis of the first cylindrical housing being co-linear with the longitudinal axis of the outlet end of the fluid conduit,
        (4) a cylindrical wall connecting the first end of the first cylindrical housing to the second end of the first cylindrical housing, the cylindrical wall having an outside surface and an inside surface that is located adjacent to the fluid conduit and which is in heat transferring communication with the fluid conduit, (5) an inside volume defined by the inside surface of the cylindrical wall of said first cylindrical housing and the fluid conduit,
(6) the outside surface of the cylindrical wall of said first hollow cylindrical housing being in fluid communication with heated gas exiting the fluid conduit, and
(7) two ports defined through the cylindrical wall of said first cylindrical housing, the ports being spaced apart from each other in the direction of the longitudinal axis of the first hollow cylindrical housing;

(e) a second hollow cylindrical housing fixed to the first and second support elements, the second hollow cylindrical housing surrounding said first hollow cylindrical housing, the second hollow cylindrical housing including
(1) a first end supported on said first support element, the first end of said second cylindrical housing being impervious to fluid,
(2) a second end supported on said second support element,
(3) a longitudinal axis extending between the first end of the second cylindrical housing and the second end of the second cylindrical housing, the longitudinal axis of the second cylindrical housing being co-linear with the outlet end axis of the fluid conduit,
(4) a cylindrical wall connecting the first end of the second cylindrical housing to the second end of said second cylindrical housing, the cylindrical wall of said second cylindrical housing having an inside surface that is located adjacent to the outside surface of the cylindrical wall of said first cylindrical housing,
(5) a gas flow volume defined by the inside surface of the cylindrical wall of said second cylindrical housing and the outside surface of the cylindrical wall of the first cylindrical housing,
(6) the outside surface of the cylindrical wall of said first hollow cylindrical housing being in heat-transferring communication with the gas flow volume,
(7) two ports defined through the cylindrical wall of said second cylindrical housing, the ports defined through the cylindrical wall of said second hollow cylindrical housing being spaced apart from each other in the direction of the longitudinal axis of the second hollow cylindrical housing and being aligned with the ports defined through the cylindrical wall of said first cylindrical housing;

(f) first and second flexible fluid conduits extending through the ports defined through the cylindrical walls of said first and second cylindrical housings, said first flexible fluid conduit having an inlet end fluidically connected to a fluid circuit of an internal combustion engine and an outlet fluidically connected to the inside volume of said first hollow cylindrical housing, said second flexible fluid conduit having an inlet end fluidically connected to the inside volume of said first hollow cylindrical housing and an outlet end fluidically connected to the fluid circuit of the internal combustion engine;

(g) a quick-connect/disconnect fitting on the inlet end of said first flexible fluid conduit; and (h) a quick-connect/disconnect fitting on the outlet end of said second flexible fluid conduit.

2. The engine pre-heater system as described in claim 1 further including a stand unit.

\* \* \* \* \*